(12) United States Patent
Maleug et al.

(10) Patent No.: US 7,120,730 B2
(45) Date of Patent: *Oct. 10, 2006

(54) SYSTEM AND METHOD FOR EXECUTING BINARY IMAGES

(75) Inventors: Michael D. Maleug, Renton, WA (US); Larry Alan Morris, Kirkland, WA (US); Bor-Ming Hsieh, Redmond, WA (US); Yadhu N. Gopalan, Redmond, WA (US)

(73) Assignee: Microsft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/305,917

(22) Filed: Dec. 19, 2005

(65) Prior Publication Data

US 2006/0101194 A1 May 11, 2006

Related U.S. Application Data

(63) Continuation of application No. 10/277,580, filed on Oct. 21, 2002, now Pat. No. 6,988,163.

(51) Int. Cl.
*G06F 12/00* (2006.01)
(52) U.S. Cl. .................................. 711/103; 365/185.01
(58) Field of Classification Search ................. 711/103
See application file for complete search history.

(56) References Cited

U.S. PATENT DOCUMENTS

| | | | | |
|---|---|---|---|---|
| 5,241,508 A | * | 8/1993 | Berenguel et al. | 365/229 |
| 5,581,788 A | * | 12/1996 | Ballare | 710/14 |
| 5,592,669 A | * | 1/1997 | Robinson et al. | 707/206 |
| 5,754,817 A | * | 5/1998 | Wells et al. | 711/203 |
| 5,822,784 A | * | 10/1998 | Garney | 711/208 |
| 6,003,135 A | * | 12/1999 | Bialick et al. | 726/29 |
| 6,519,593 B1 | * | 2/2003 | Matias et al. | 707/7 |
| 6,601,167 B1 | * | 7/2003 | Gibson et al. | 713/2 |
| 2002/0034105 A1 | | 3/2002 | Kulkarni et al. | 365/200 |
| 2003/0028708 A1 | * | 2/2003 | Moran | 711/103 |
| 2003/0163632 A1 | * | 8/2003 | Aasheim et al. | 711/103 |
| 2004/0044708 A1 | * | 3/2004 | Linke et al. | 707/205 |

* cited by examiner

*Primary Examiner*—Brian R. Peugh
*Assistant Examiner*—Hashem Farrokh
(74) *Attorney, Agent, or Firm*—Woodcock Washburn

(57) ABSTRACT

A system that determines where a particular XIP component is stored on a medium and loads the component into RAM for execution, providing the ability to demand page specific components at will from storage media, frees up working RAM on memory constrained devices. A Binary File System uses a generic block driver component that loads the XIP code from a block based storage medium. Features of the file system include the ability to load pre-"fixed up" components from a block based device. The invention thus allows an operating system to load code that was previously Executed In Place (XIP) from a block-oriented device.

6 Claims, 5 Drawing Sheets

SYSTEM AND METHOD FOR EXECUTING BINARY IMAGES

CROSS REFERENCE TO RELATED APPLICATION

This application is a Continuation of U.S. patent application Ser. No. 10/277,580 now U.S. Pat. No. 6,988,163, filed Oct. 21, 2002 (MSFT-1519). The invention relates generally to executing binary images and more particularly to systems and methods for executing binary images from non-linear storage systems.

BACKGROUND OF THE INVENTION

Execute in place (XIP) images are fixed position images and are built to execute on a CPU or processor from a specific location in a computer memory device. The location must be accessible in a linear format so that the CPU can fetch and execute individual instructions; thus, DRAM and NOR flash memory are commonly used memory storage devices that are used for XIP image execution. Block addressable devices such as disk storage systems are generally not usable for execute in place images because memory in such devices must be read one block at a time and is not addressable at the individual instruction level.

Contemporary computer systems combine various types of memory and storage subsystems such flash memory, ROM, RAM, and disk storage. Read access times can vary greatly among various storage devices and often influences the combination of the various storage subsystems to maximize cost and performance. For example, the following list of devices have read access times that are listed in order starting with the shortest read access time to the longest read access times): SDRAM, flash memory (NAND and NOR are not differentiated, it depends on read mode), and then disk drives. For non-volatile memory types, erase and write times, or the ability to update data, also varies greatly among device types. For example, the following device types are listed in order starting with the shortest write times: NAND flash memory, NOR flash memory, and then disk drives. SDRAM has the fastest erase and write times.

NAND flash memory typically does not support executing code in place from the flash memory part and thus typically requires a linear non-volatile memory solution such as NOR flash memory or ROM for boot-time initialization. NAND vendors offers hybrid designs like NAND flash memory with a small NOR boot block or logic designs that enable a CPU to read from a particular good NAND block at reset time to address this issue.

NOR flash memory provides non-volatile storage. Typically there is no BIOS or boot loader present, this means that code execution will need to start from the NOR flash memory at CPU reset, thus prohibiting compression of the entire image to save space and perhaps allow for a smaller NOR part.

Non-writeable ROM, most likely production masked ROM, provides non-volatile storage. The topology is very similar to NOR flash memory with the same design trade offs. The main benefit of ROM designs over NOR flash memory is typically related to the cost advantage, depending on volumes, of replacing the NOR flash memory with a ROM part. A downside is effectively the lack of a real software upgrade path for field devices other than physical replacement of the ROM part.

A single NAND flash memory device provides non-volatile storage. Because NAND is a block device and does not support a linear interface, the CPU cannot directly execute code stored in NAND flash memory. As a result, for this configuration to work, conventionally a non-volatile linear storage area is required—many hybrid NAND flash memory parts contain a small linear NOR region called a boot block.

NAND flash memory is a block-accessed storage device, very much like a conventional electro-mechanical disk drive with a serial interface. For this reason, NAND flash memory is generally not suitable for XIP solutions because the CPU requires program memory to be linear. Instead, NAND flash memory images are typically moved to DRAM during execution either at boot time or by OS paging. This ties the cost of NAND flash memory-based devices more closely to the fluctuating DRAM market prices.

The typically shorter erase and write access times for NAND flash memory over conventional linear flash memory is an advantage. Read access times for both NAND flash memory and conventional linear flash memory are comparable. In addition, the erase cycle is typically an order of magnitude greater than linear flash memory, thereby extending the lifespan of the NAND flash memory part. This cost-per-byte benefit and the larger storage sizes offset the added complexity involved in the NAND solution and any additional expense in DRAM.

The standard ATA or IDE hard disk drive can also be a good choice for image storage. Like NAND flash memory, disk drives are non-linear, block-accessed devices. This means that a CPU cannot directly execute (XIP) code from disk. Instead, the XIP code must first be copied to linear memory (DRAM), where the CPU can execute it. Read and write access times are significantly longer than that of solid-state devices, but the storage capacity of disk drives is much larger.

SUMMARY OF INVENTION

As a result of today's memory-intensive applications, services and media objects, devices have less and less working RAM available and correspondingly need more and more RAM to operate at the same performance level. In response, the invention provides a file system that determines where a particular operating system (OS) component is stored on a medium and loads the component into RAM for execution, providing the ability to demand page specific components at will from storage media, freeing up working RAM on memory constrained devices. In one embodiment, the invention provides a Binary File System (BinFS), a generic "block driver-agnostic" component that loads the OS from a block based permanent storage medium. Features of the BinFS component include the ability to load pre-"fixed up" components from a block based device. The invention thus allows the OS to load code that was previously Executed In Place (XIP) from a block oriented device. The OS image remains "fixed up" as it was previously, but can advantageously be obtained using the file system of the invention.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The following discussion is directed to executing fixed-up binary images from non-linear memory. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary Computer System

Figure 1:
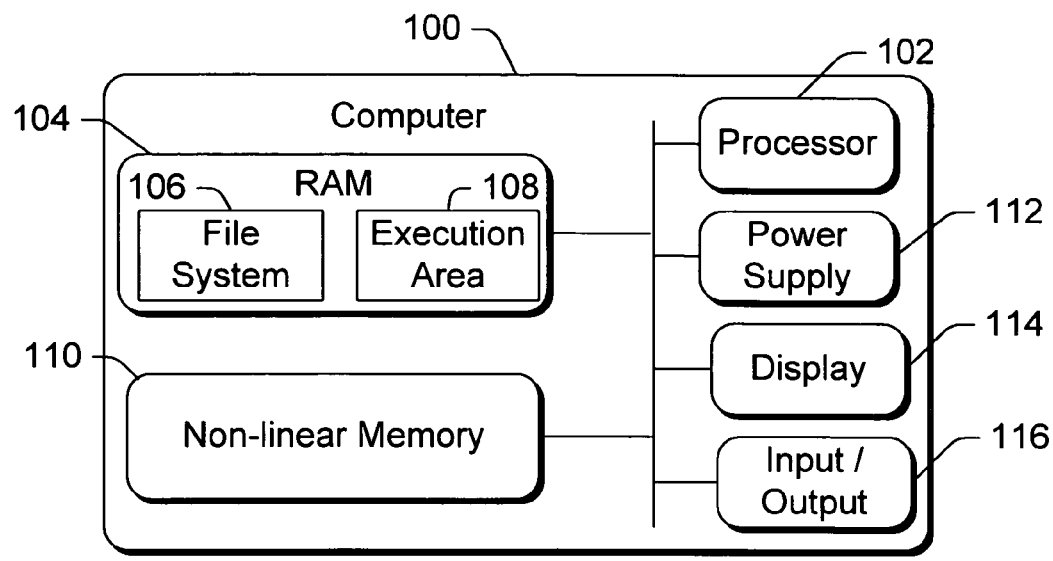
FIG. 1 is a diagram depicting a computer system wherein aspects of the invention may be incorporated.

FIG. 1 illustrates functional components of a computer 100, such as a handheld computer, wherein aspects of the invention can be incorporated. The computer 100 represents many processing systems, such as desktop computers, notebook system, portable wireless communication handsets, palmtops, personal digit assistants (PDAs), pocket personal computers (PCs), portable gaming systems, multimedia systems, the combination of any of the above example devices and/or systems, and other similar computer devices. Computer 100 includes a processor 102, RAM 104, Non-linear memory device 110, a power supply 110, display 112 and input/output interfaces 114. RAM 104 is a volatile memory. Resident on the RAM is file system RAM 106 and execution area RAM 108. Non-linear memory device 110 exemplifies non-linear memory devices for computer 100. Non-linear memory device 110 can be any memory device where the CPU cannot fetch individual addresses; rather the memory device must be read in blocks. In most instances the non-linear memory is implemented in NAND flash memory although any type of non-linear memory device can be used such as a disk drive system.

The computer 100 has a power supply 110 that is may implemented through rechargeable batteries. The power supply 110 may further include an external power that overrides or recharges the built-in batteries, such as an AC adapter or powered docking cradle. The display 112 can take many forms such as a screen, touch screen, LEDs, etc. The input/output interfaces 114 can also take many forms depending on the computer 100 such as a keyboard, IR port, serial port, and so forth. The computer 100 can include more than one of any of the aforementioned elements. Other elements such as touch pads, vibrating devices, wireless communication components and so forth are not shown, but could easily be a part of the exemplary computer 100.

Exemplary Binary Memory Images

Figure 2:
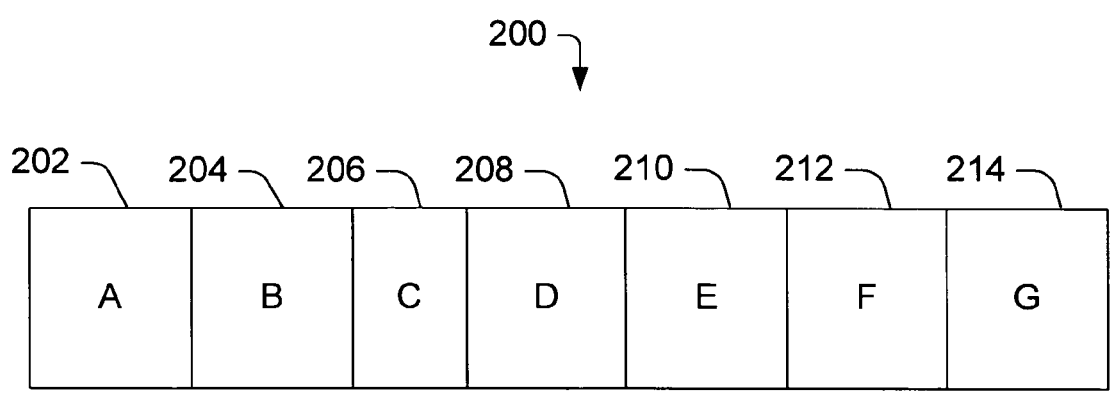
FIG. 2 is a layout of an XIP program that may be used in conjunction with the invention.

FIG. 2 shows an exemplary implementation of a binary image 200 stored in memory 110. The image 200 is logically partitioned into a plurality of separate independent regions 202–214. Each of the regions 202–214 can be logically viewed as a plurality of independent binary images that form a set of binary image 200 that may interact together such as applications, DLLs, drivers, etc. Although each region is shown as being contiguous, it is possible that that the actual logical and/or physical address locations for each region may be at various arbitrary areas in a non-linear memory 110 that are not necessarily contiguous. Each of the regions 202–214 can also vary in size depending on the contents intended for a particular region.

Each of the regions 202–214 are intended to store executable binary programs (hereinafter referred to as application programs), the contents of which are represented by A–G. In one implementation, an application program is assigned to one specific region. Usually related applications and related miscellaneous items are usually placed in a single binary region to make updates easier. An application program is generally restricted to a specific region to reduce the size of files needed to be downloaded when updating an application program.

The binary image 200 is generally created by an image fix-up tool that takes relative addressed instructions that are created by a compiler, or similar tool that generates computer code that is executable by a CPU, and creates absolute addressed instructions that will reside and run from a particular memory location i.e. so that they can be fetched by a CPU for execution. The image fix up tool will create address links to other stand alone code such as DLL's etc. So that when the image fix-up tool is finished, the entire binary image 200 for performing a particular set of operations is completed and ready for execution in place (XIP).

Storage on Block Addressable Memory Device

Figure 3:
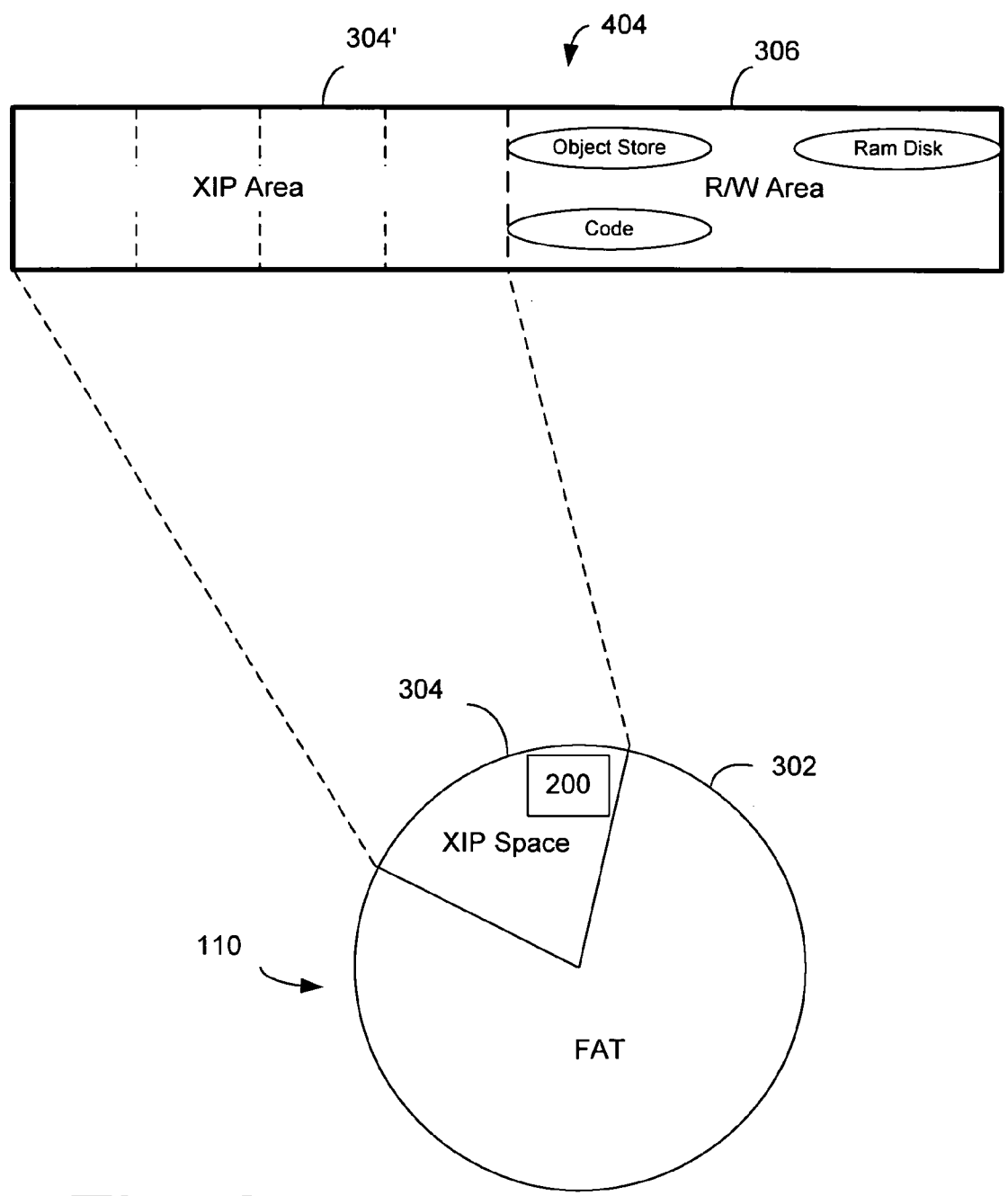
FIG. 3 is an illustration of XIP files being stored in a non-linear, block-addressable storage device in accordance with the invention.

FIG. 3 illustrates an aspect of the invention wherein one or more binary images 200 are stored on a non-linear memory device 110 (e.g., block addressable storage device such as a disk storage device). The one or more binary images 200 for a part of an XIP memory image 304' that forms a virtual memory 404 that can be executed by processor 102. Notably, the non-linear storage device 110 can be partitioned and continue to function as a normal non-linear storage device. For example, as illustrated in FIG. 3, a disk storage device 110 is partitioned into a XIP space 304 and a FAT space 302.

The virtual memory space 304' into which the XIP memory 304 maps may also comprise a conventional R/W area 306 that may contain variables that are read to and written by processor 102. That is, XIP area 304' or virtual memory is non-writable. Thus, there is a portion 306 of virtual memory space that is readable and writeable and can contain an object store, code, a ram disk, etc. Interestingly, a ram disk itself may be used by the invention as the underlying non-linear memory device 110.

System Operation

Figure 4:
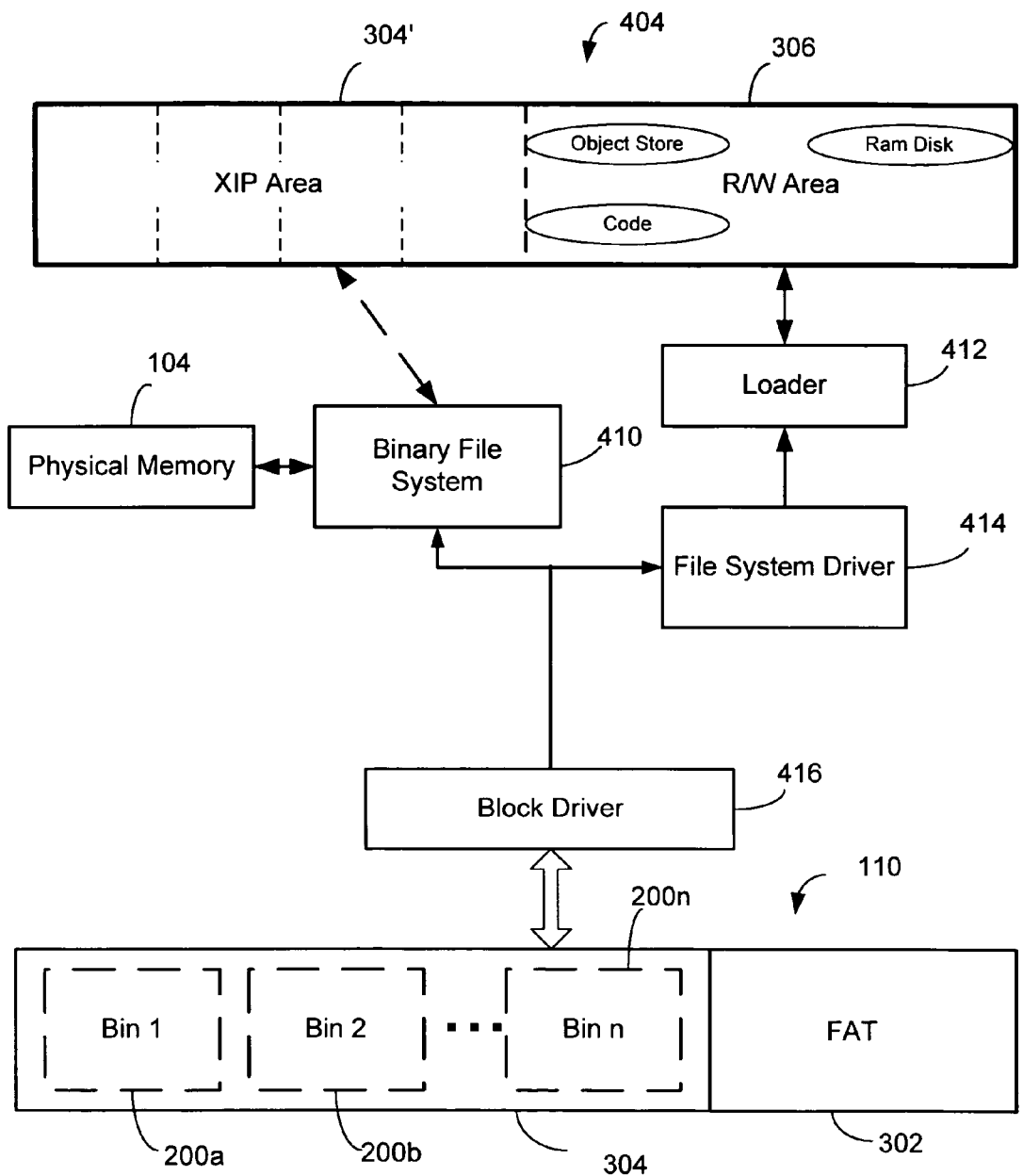
FIG. 4 is a block diagram of a system incorporating a binary file system in accordance with aspects of the invention.

FIG. 4 further illustrates aspects of the invention. As shown in FIG. 4, the underlying non-linear memory device 110 is addressed using a conventional block driver 416 that accesses the XIP partition 304 or the FAT partition 302 and retrieves blocks of memory, e.g., a disk sector. The XIP partition 304 contains one or more binary images, e.g., Bin 1 200a, Bin 2 200b, Bin n 200n. Optimally, XIP space 304 maps to the XIP area 304' in virtual memory 404. The XIP space 304 is mapped into XIP area 304' by Binary File System 410. Binary File System 104 retrieves blocks of memory representing portions of binary images 200a–200n from non-linear memory 110 and loads them into physical memory 104 as needed.

The aspects of the invention described may coexist with a conventional system for loading binaries wherein the binaries are bound at load time. In such a system, file system driver 414 access files from the FAT partition of memory device 110. Loader 412 then fixes up the absolute memory addresses as necessary. That is loader 412 consolidates exe files, DLL files, and so on and generates a binary image in the conventional manner which can then be loaded into virtual memory 404.

Computer systems such as hand held computers generally create executable components in one of two different forms at build time: position independent, also called relocatable, forms; or fixed position, also called execute in place as described above (XIP), forms. At run time loader 412 fixes relocatable code to run at an available virtual memory RAM address dynamically chosen by the loader. The benefit is an efficient use of system RAM without requiring the system to explicitly specify the RAM layout. The downside is slightly longer load times as the OS loader handles the relocation. In addition, there is less flexibility in determining where the code executes from because code can only be relocated to RAM.

Typically, the virtual memory is written to a portion of the non-linear memory such as a disk drive file in pages. For example, virtual memory may be stored in the FAT portion 302 of non-linear storage device 110. The pages are then loaded on demand from the virtual memory 404 into physical memory 104. In this way, a relatively small physical address space can be made to appear significantly larger by swapping pages between virtual memory and physical memory. According to an aspect of the present invention, when physical memory contains a binary file stored in the XIP space 304, the page does not have to be swapped to virtual memory stored in the FAT portion 302 of non-linear memory device 110. Rather, the physical memory containing the portion of binary 200a–200n can merely be overwritten without swapping out the contents of physical memory. This is so because that binary 200a–200n can simply be retrieved from the XIP space 304 as needed.

Figure 5:
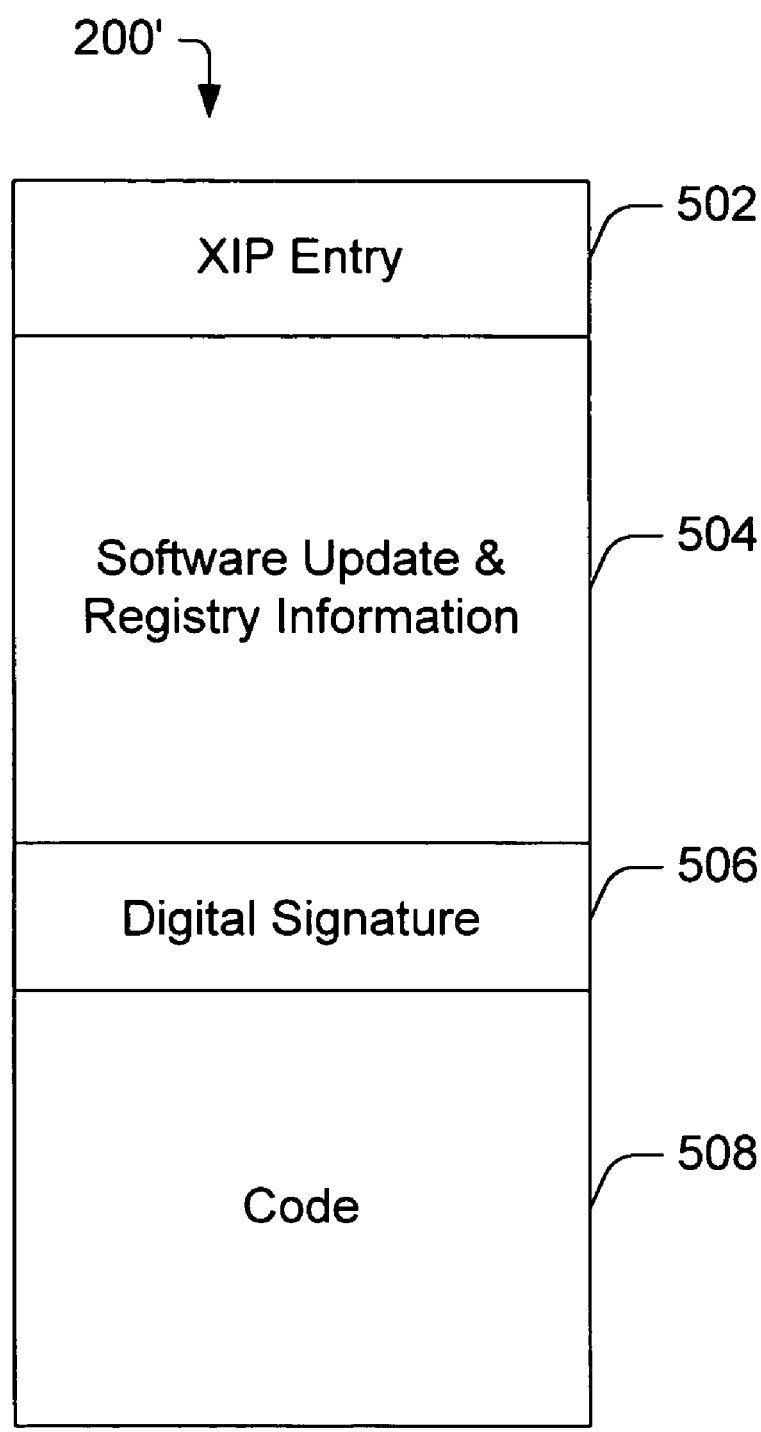
FIG. 5 is a diagram depicting an XIP header and other identifying information for use with the invention.

FIG. 5 shows a binary file 500 that is stored on a medium and illustrates an embodiment of a binary file having characteristics helpful in loading binary file 500 from a block storage device. In one implementation, the binary file 500 includes an XIP entry header 502, registry information 504; and a digital signature 506.

The XIP entry header 502 contains information about the size of the binary code contained within section 504 and the start address for the region. In other implementations it is possible to include other information in the XIP entry header, such as the version of the software, a public key and so forth.

The digital signature 506 of the XIP file provides unique security information about the file 500. This digital signature is checked against a security key. This guarantees that the software is legitimate prior to the software being installed in physical memory 104. Having private keys ensures that only certain owners of a particular region can build and update contents of a binary 200. Security also ensures that the binary file does not become replaced with corrupted unauthorized files, which could cause catastrophic failure for the computer 100.

Figure 6:
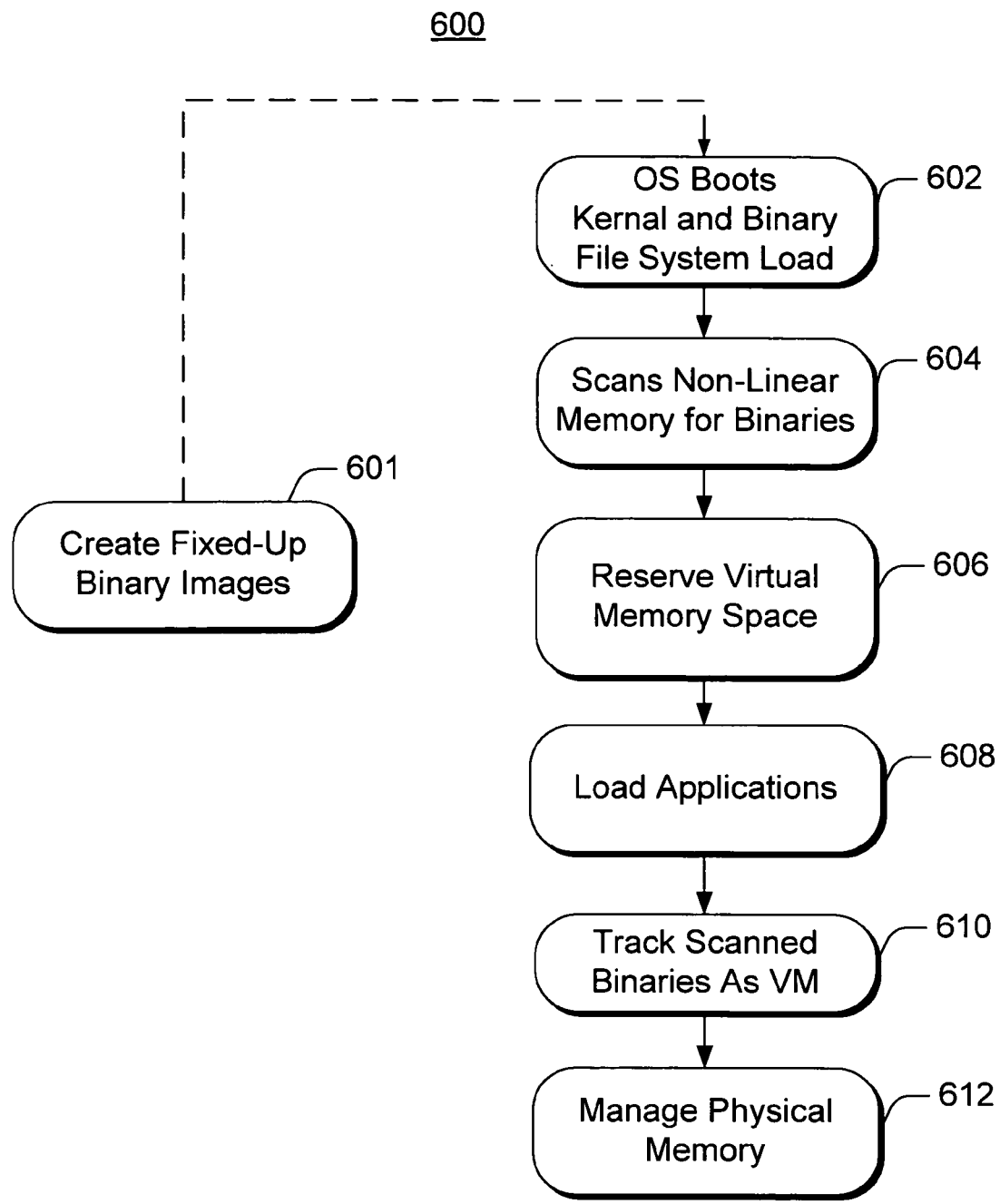
FIG. 6 is a flow chart of an operation incorporating aspects of the invention.

FIG. 6 is a flow chart illustrating a process 600 for creating and loading XIP binary files in accordance with an aspect of the invention. Initially at block 601, XIP binary files are created. For example, the ROM Image Builder tool, Romimage.exe, is a build tool for WINDOWS CE that runs in the final phase of the build process. Romimage.exe performs the following functions:

Collects all the requisite components that make up the final image including drivers, executables, and data files.

Performs fix ups on any executable code in a space efficient manner, thus detailing where code will execute from by default.

Other binary file image building tools could also be used. After the XIP binary files are created they can be loaded onto the XIP partition 304.

Thereafter, the system can start up. Typically, the boot loader is the first bit of code to run on a device after hardware reset or startup with the possible exception of BIOS/POST code. The boot loader is responsible for locating, loading, and executing the OS image. The loader typically resides in CPU accessible linear memory, although there are instances where the loader resides on a block accessed device such as a disk drive or NAND flash memory, for example, the BIOS boot loader which relies on the PC BIOS bootstrap process to load it into RAM and execute it.

When searching for a valid OS image to load, the boot loader will typically look in local storage first. Verifying that an image is valid can involve checking the signature of the stored image—such as hashing the important contents of the image and then generating a digital certificate, which is compared against the image—or can be based on a simpler validation like a checksum.

The binary file system in accordance with the present invention is also loaded into memory. At block 604, the binary file system then scans the XIP partition 304 for XIP binary files. The files are scanned by scanning the binary file header and other information as described in connection with FIG. 5. After all of the binary files are found, the virtual memory space is reserved by requesting memory locations and spaces required to run each XIP binary file.

At block 608 various applications needed to run the system are loaded into memory such as drivers and so on. The scanned binary files are then tracked and paged into virtual memory as needed as indicated by block 620. Physical memory is managed using the rest of the virtual memory as in a typical virtual memory system.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for managing memory, comprising:

storing on a non-linearly addressable memory device, a software component comprising a set of computer-executable instructions, wherein the computer-executable instructions are fixed to be executed from a predefined memory location wherein storing the software component includes taking the computer-executable instructions and placing them in a particular memory location, wherein the instructions are placed in physically contiguous regions of the non-linearly addressable memory;

loading the set of computer-executable instructions into a linearly addressable memory device using a file system when at least one of the computer-executable instructions is fetched by a processor wherein the instructions are placed in arbitrary regions of the non-linearly addressable memory; and scanning the non-linearly addressable memory for the instructions by examining the headers of the instructions before loading them into the linearly addressable memory.

2. The method according to claim 1, wherein storing the software component includes creating the software component by collecting the requisite computer-executable instructions, including drivers, executables, and data files.

3. The method according to claim 1, wherein the instructions are placed in arbitrary regions of the non-linearly addressable memory.

4. The method according to claim 1, wherein storing includes creating the instructions, including creating absolute addressed instructions based on relative addressed instructions.

5. The method according to claim 4, wherein creating the absolute addressed instructions from relative addressed instructions is performed by an image fix-up tool.

6. The method according to claim 5, wherein the image fix-up tool creates address links among the instructions.

* * * * *